Patented Oct. 11, 1932

1,882,200

UNITED STATES PATENT OFFICE

GERHARD STEIMMIG, OF LUDWIGSHAFEN-ON-THE-RHINE, GERMANY, ASSIGNOR, BY MESNE ASSIGNMENTS, TO WINTHROP CHEMICAL COMPANY, INC., OF NEW YORK, N. Y., A CORPORATION OF NEW YORK

PRODUCTION OF PERFUMES

No Drawing. Application filed July 3, 1928, Serial No. 290,265, and in Germany April 24, 1925.

This invention is a continuation in part of the invention which is the subject-matter of application for Letters Patent Ser. No. 103,951, filed April 22nd, 1926 and relates to the production of perfumes and of cosmetic preparations containing such perfumes.

I have found that excellent perfumes and cosmetic preparations containing the same may be prepared by employing glycol ethers of phenols and the homologues thereof such as glycol-mono-phenyl-ether, glycol-mono-phenyl-ether acetate, glycol-mono-cresyl-ether, propylene glycol-mono-phenyl ether and butylene glycol-mono-phenyl ether as solvents and fixatives for the said perfume. Also the glycol esters or aromatic monocyclic acids, such for example as the salicylic acid ester of the lower glycol-mono-alkyl ethers and the like may be employed with advantage as solvents and fixatives for perfumes. The said solvent and fixation substances are hereinafter referred to for the sake of brevity as compounds consisting of mono-cyclic aromatic radicles linked by means of oxygen with a radicle of a glycol. The expression "glycol" when used herein generically also includes the homologues thereof such as propylene glycol and butylene glycol. The term "fixatives" denotes in the art substances which are capable of extending the perfuming action of a perfume by reducing the volatility of the perfuming component of said perfume; the said effect can be obtained with liquid and with solid perfuming components, such as oil of lavender or vanillin.

The following examples will further illustrate the nature of the said invention which however is not limited thereto.

Example 1

A liquid perfume, for example oil of lavender or benzyl acetate is dissolved in an equal amount of glycol-mono-phenyl ether. The solution may be employed for perfumery purposes.

The said ether may also be employed for dissolving either liquid or solid perfumes in various proportions, for example, 1 part of vanillin or cumarin in 2 parts and 1 part of muskambrette in 5 parts of glycol-mono-phenyl ether. Also resins are excellently soluble therein, 1 part of benzoic Palembang may for example be easily dissolved in 1 part of this glycol ether. The most suitable proportions can be easily ascertained by simple tests. Also other glycol ethers and the derivatives thereof, such as the salicylic acid ester of glycol-mono-methyl or ethyl ether may be employed as solvents and fixatives for the perfume component.

Example 2

A valuable lilac soap perfume is obtained by dissolving 5 parts of terpineol, 1 part of anisaldehyde, 2 parts of benzyl acetate, 2 parts of heliotropine and 1 part of phenyl ethyl alcohol in 2.2 parts of glycol mono-phenyl ether. The glycol phenyl ether acts in this solution as a fixative.

Example 3

An excellent attar of roses in which glycol mono-phenyl ether acts as a fixative is obtained by mixing 5 parts of phenyl-ethyl-alcohol, 2 parts of d-citronellol, 2 parts of 1-citronellol, 5 parts of geraniol and 1.5 parts of glycol-mono-phenyl ether. The employment of the said glycol ether as a fixative is not limited to the perfumes mentioned in the foregoing examples. Any other perfume constituents containing the said ether may be compounded in a similar manner.

Also other glycol ethers or their derivatives, such for example as glycol-mono-phenyl ether acetate, the salicylic acid ester of the lower glycol-mono-alkyl ethers and the like may be employed with advantage as fixatives for perfumes.

What I claim is:—

1. A perfume composition comprising essentially a perfume and, as a fixative, a compound consisting of a mono-cyclic aromatic radicle connected by means of oxygen with a radicle of a glycol.

2. A perfume composition comprising essentially a perfume and, as a fixative, a monocyclic aromatic mono-ether of a glycol.

3. A perfume composition comprising essentially a perfume and, as a fixative, glycol-mono-phenyl ether.

4. A slowly evaporating perfume composition comprising phenyl ethyl alcohol, d-citronellol, 1-citronellol, geraniol, and, as a fixative, glycol-mono-phenyl ether.

In testimony whereof I have hereunto set my hand.

GERHARD STEIMMIG.